United States Patent Office 3,712,920
Patented Jan. 23, 1973

3,712,920
2,5-THIOPHENEDIYL-BIS(IODONIUM SALTS)
Zdravko Jezic, Midland, Mich., assignor to The Dow Chemical Company, Midland, Mich.
No Drawing. Filed May 31, 1968, Ser. No. 733,234
Int. Cl. A61k 27/00; C07d 63/14
U.S. Cl. 260—332.5        8 Claims

ABSTRACT OF THE DISCLOSURE

The novel compounds (I-phenyl)-I'-phenyl-I,I'-(2,5-thiophenediyl)-bis(iodonium salts) are prepared by condensing a phenyl-2-thienyliodonium trifluoroacetate with a (diacetoxyiodo)benzene in the presence of sulfuric acid. The compounds are useful as antimicrobials for the inhibition of the growth of many bacterial and fungal organisms.

SUMMARY OF THE INVENTION

The present invention is directed to new 2,5-thiophenediyl-bis(iodonium salts) corresponding to the formula

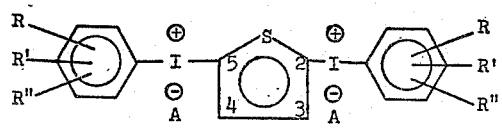

In this and succeeding formulas, each R represents hydrogen, fluoro, chloro, bromo, loweralkyl or loweralkoxy, each R' represents R or trifluoromethyl, each R" represents R, trifluoromethyl, nitro, or acetamido and A represents an anion such as chloride, bromide, iodide, hydrogen sulfate ($HSO_4^-$), nitrate, tetrafluoroborate ($BF_4^-$), trifluoroacetate ($CF_3CO_2^-$) or lactate ($CH_3CHOHCO_2^-$).

In the present specification and claims, loweralkyl and loweralkoxy represent moieties containing from 1, to 2, to 3, to 4 carbon atoms, repsectively. Representative alkyl and alkoxy moieties include methyl, ethyl, propyl, isopropyl, butyl, isobutyl, sec.-butyl, tert.-butyl, methoxy, ethoxy, propoxy, isopropoxy, butoxy, isobutoxy, sec.-butoxy and tert.-butoxy. Representative substituted phenyl moieties include fluorophenyl, chlorophenyl, bromophenyl, chlorobromophenyl, chlorofluorophenyl, fluorobromophenyl, fluorochlorobromophenyl, triloweralkylphenyl, triloweralkoxyphenyl, loweralkyl diloweralkoxyphenyl, loweralkoxy diloweralkylphenyl, (trifluoromethyl)phenyl, nitrophenyl, acetamidophenyl, fluoro nitrophenyl, bromo isopropylphenyl, chloro butoxyphenyl, tribromophenyl, chloroxylyl, fluoro diethoxyphenyl and nitroxylyl. The new compounds of the present invention are crystalline solids which are soluble in hot water and in aqueous polar organic solvents such as methanol, ethanol, isopropyl, dimethyl formamide, dimethyl sulfoxide and formic acid. The new compounds of this invention are highly toxic to microbes and are useful for the control of a wide variety of bacerterial plants.

Representative 2,5 - thiophenediyl-bis(iodonium salts) include 2,5-thiophenediyl-bis(phenyliodonium chloride),
(I-2-bromo-5-chloro-3-tolyl)-I'-5-chloro-2-nitrophenyl-I,I'-(2,5-thiophenediyl)-bis(iodonium chloride),
(I-2-phenyl)-I'-4-chlorophenyl-I,I'-(2,5-thiophenediyl)-bis(iodonium trifluoroacetate),
2,5-thiophenediyl-bis(4-chlorophenyliodonium chloride),
2,5-thiophenediyl-bis(4-fluorophenyliodonium chloride),
(I-4-chlorophenyl)-I'-4-tolyl-I,I'-(2,5-thiophenediyl)-bis(iodonium bromide),
(I-3-nitro-4-tolyl)-I'-4-fluorophenyl-I,I'-(2,5-thiophenediyl)-bis(iodonium tetrafluoroborate),
2,5-thiophenediyl-bis(4-acetamidophenyliodonium iodide),
(I-2,5-dichlorophenyl)-I'-3,4-diethoxyphenyl-I,I'-(2,5-thiophenediyl)-bis(iodonium tetrafluoroborate),
2,5-thiophenediyl-bis(3,4-dibtuylphenyliodonium nitrate),
(I-4-propoxyphenyl)-I'-3-(trifluoromethyl)phenyl-I,I'-(2,5-thiophenediyl)-bis(iodonium lactate),
2,5-thiophenediyl-bis(3,4-dichlorophenyliodonium chloride),
2,5-thiophenediyl-bis(3,4,5-trichlorophenyliodonium lactate),
2,5-thiophenediyl-bis(2,6-dichloro-4-ethylphenyliodonium lactate),
2,5-thiophenediyl-bis(2,6-diethoxy-4-nitrophenyliodonium tetrafluoroborate),
2,5-thiophenediyl-bis(3,5-di-trifluoromethyl-2-chlorophenyliodonium lactate), and
2,5-thiophenediyl-bis(4-acetamido-2-tolyliodonium chloride).

DETAILED DESCRIPTION OF THE INVENTION

The 2,5-thiophenediyl-bis(iodonium hydrogen sulfate) salts are prepared by reacting together a phenyl-2-thienyliodonium trifluoroacetate, having the formula

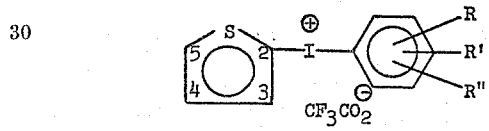

a (diacetoxyiodo)benzene having the formula

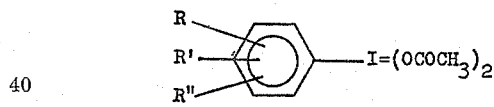

and sulfuric acid. The reaction is carried out in a liquid reaction medium which is non-reactive with the reagents and conveniently in acetic anhydride, glacial acetic acid, trifluoroacetic acid or mixtures thereof as reaction medium. The reaction consumes the reagents in proportions of two molar amounts of sulfuric acid per molar amount of iodonium trifluoroacetate and of diacetoxyiodo reagent. For the initiation of the reaction of the production of the desired compounds, it is essential to employ at least a 100 percent molar excess of sulfuric acid (i.e., at least 4 molar proportions of sulfuric acid) based upon the molar proportion of that one of the other reactants present in the reaction mixture in the lesser amount. There is no upper operable limit to the amount of excess of sulfuric acid which can be used other than an economic limit. In general, however, no advantage is gained in using sulfuric acid in excess of more than about 1200 percent. A small excess of up to about 25 percent of either organic reagent oftentimes gives some improvement in yield. In practice the diacetoxyiodo reagent is preferred to be used in excess because of economic considerations. The reaction is exothermic and proceeds under temperatures of about —30° to —5° C. and is preferably carried out at temperatures of from —20 to —10° C. Upon completion of the reaction, the desired 2,5-thiophenediyl-bis(iodonium hydrogen sulfate) is separated by conventional procedures.

In a convenient method of carrying out the reaction, the thienyliodonium trifluoroacetate and the diacetoxyiodo starting materials are suspended in the reaction medium and concentrated sulfuric acid is gradually added thereto portionwise with continued agitation and external cooling. The reaction is exothermic and goes forward readily when at least 100 percent excess of the sulfuric acid based upon that one of the other reactants present in the lesser amount is added. The temperature of the reaction mixture is controlled by regulating the rate of the sulfuric acid addition and by external cooling. The resulting mixture is allowed to stand for a period of time at a temperature between about −10 and room temperature after all of the sulfuric acid has been added to insure completion of the reaction. The reaction mixture is then cooled and diluted with water and the desired bis(iodonium hydrogen sulfate) is recovered by concentrating the resulting solution to give a solid crystalline residue. This residue may be further purified by crystallization from aqueous polar organic solvents such as dimethylformamide, dimethylsulfoxide or hot water.

The 2,5-thiophenediyl-bis(iodonium chloride), bromide and iodide salts are prepared from the solutions of the corresponding hydrogen sulfate salt by treatment of the hydrogen sulfate salt solution with aqueous hydrogen halide. The amounts of the hydrogen halide reagent to be employed are not critical, some of the desired halide salt being obtained when employing the reagent in any proportions. However, the reaction consumes the hydrogen halide reagent in substantially twice equimolar proportions, and the use of the hydrogen halide reagent in such amounts is preferred. The halide salt formation takes place readily at temperatures between 0 and 100° C. with the production of the desired bis-iodonium compound as halide and sulfuric acid of reaction. During the reaction, the halide salt usually precipitates in the reaction mixture as a microcrystalline solid. Following the reaction, the reaction mixture may be concentrated under reduced pressure to remove volatile constituents and bring about precipitation of the desired salt product. The bisiodonium halides so prepared may be separated by decantation or filtration. The halides can be further purified by recrystallization from various aqueous polar organic solvents such as methanol, ethanol, isopropanol, dimethyl formamide and dimethyl sulfoxide or from water.

The 2,5-thiophenediyl-bisiodonium nitrates, tetrafluoroborates and lactaces are prepared from the corresponding bisiodonium halides and conveniently from the corresponding chloride. In such operations, the bisiodonium halide is treated with silver nitrate, silver tetrafluoroborate, or silver lactate in aqueous ethanol as reaction medium. The reaction takes place readily with the production of the desired salt product and silver halide. The methods of contacting the reagents and conditions of reaction are as described in the preceding paragraph. Upon completion of the reaction, the desired salt product is separated by decantation or filtration. An alternative method for preparing the lactate salt from the hydrogen sulfate salt is by treatment of the latter with aqueous barium lactate. The methods of contacting the reagents and conditions of reaction are as described above.

The following examples describe completely representative specific embodiments and the best modes contemplated by the inventor for carrying out the invention.

EXAMPLE 1

2,5-thiophenediyl-bis(phenyliodonium chloride)

To a suspension of 9.7 grams (0.03 mole) of (diacetoxyiodo)benzene and 10 grams (0.025 mole) of phenyl-2-thienyliodonium trifluoroacetate in 100 milliliters of acetic anhydride is added 35 milliliters (0.63 mole, 1160 percent excess) concentrated sulfuric acid (96 weight percent $H_2SO_4$) dropwise over a period of 1½ hours. When approximately one-third of the initial volume of sulfuric acid is added, the reaction mixture becomes a pale yellow solution. After the sulfuric acid addition is completed, the solution becomes denser and the temperature is gradually increased from −30 to −10° C. during a period of 1 hour. Since the reaction mixture then almost solidifies, stirring is discontinued and the flask contents are poured on 100 grams of ice. The pale yellow solution resulting is then evaporated to approximately one-fifth of the initial volume by blowing with air at room temperature. The crystalline solid hydrogen sulfate salt which precipitates out is filtered and washed with water and finally with acetone. The dry, white product resulting weighs 12.7 grams (ca. 74.5 percent yield, trifluoroacetate reactant basis) and melts at 195–197° C. with decomposition. The filtrate from the hydrogen sulfate salt is treated with 5 milliliters of concentrated hyrochloric acid to give the chloride salt, a white material which melts at 179–190° C. with decomposition. A small amount of the crude chloride is recrystallized from boiling water and melts at 203–205° C. with decomposition. A third recrystallization from boiling water increases the melting range to 208–210° C. with decomposition. The main amount (12.7 grams) of the original hydrogen sulfate salt is dissolved in 50 milliliters of formic acid at room temperature, is filtered using a fritted disc filter and the clear, pale, greenish-yellow filtrate resulting is treated dropwise with concentrated hydrochloric acid added over a 10 minute period with stirring. A white precipitate is formed and after stirring for one hour is filtered and the precipitate washed well with acetone. 10.1 grams of white microcrystalline chloride salt is obtained, which melts at 207–209° C. with decomposition. The total amount of recoverable chloride salt is 13.0 grams, a yield of 92.8 percent. Upon recrystallization, tiny hexagonal prisms are obtained having a slightly yellowish off-white color. Carbon, hydrogen and iodine analyses, nuclear magnetic resonance, infrared and mass spectrometric analysis (time of flight method) support the named structure.

EXAMPLE 2

(I-4-chlorophenyl)-I'-4-tolyl-I,I'-(2,5-thiophenediyl)-bis(iodonium chloride)

To a suspension of 16.5 grams (0.049 mole) of 4-diacetoxyiodo)toluene and 17.5 grams (0.040 mole) of 4-chlorophenyl-2-thienyliodonium trifluoroacetate in 180 milliliters of acetic anhydride maintained at −20° C. with continuous stirring is added dropwise over a period of twenty minutes, 16 milliliters (0.288 mole, 260 percent excess) of concentrated sulfuric acid. The reactants completely dissolve after the addition of ca. one-half of the sulfuric acid. Near the end of the sulfuric acid addition, the reaction mixture becomes brownish-orange colored. After the sulfuric acid is added, stirring at −20° C. is continued for twenty minutes longer with discontinuance of cooling. The reaction mixture is stirred at room temperature for an additional five hours. The reaction mixture is then slowly poured into 250 milliliters of cold water surrounded by an ice bath while stirred with a magnetic stirrer. The resulting orange-yellow hazy aqueous solution is treated with 35 milliliters of concentrated hydrochloric acid added dropwise with stirring and cooling for 30 minutes. A slightly off-white precipitate is formed which is filtered off, washed with 100 milliliters of aqueous 10 percent hydrochloric acid, then with acetone. The resulting chloride salt weighs 17.6 grams, a yield of approximately 72 percent based on the thienyliodonium trifluoroacetate. It melts at 188–194° C. with decomposition. The filtrate and washings from the chloride salt are treated with 5 milliliters of concentrated hydrobromic acid and the resulting precipitate is filtered off. It is washed with acetone and dried to give the corresponding bromide salt. It melts at 175–177° C. with decomposition. The corresponding nitrate salt, prepared by reacting two molar proportions of silver nitrate per molar proportion of the chloride salt in ethanol, filtering the precipitate off and evaporating the filtrate to dryness, melts at 186–187° C. with decomposition.

EXAMPLE 3

(I-4-chlorophenyl)-I'-4-tolyl-I,I'-(2,5-thiophenediyl)-bis(iodonium chloride)

To a suspension of 17.3 grams (0.040 mole) of p-tolyl-2-thienyliodonium trifluoroacetate and 14.3 grams (0.040 mole) of 4-chloro-1-(diacetoxyiodo)benzene in 180 milliliters of acetic anhydride, stirred and maintained at −20° C., is added 16 milliliters (0.288 mole) of concentrated sulfuric acid by dropwise addition over a twenty minute period. The procedure of the preceding example is otherwise followed. Before treatment with hydrochloric acid, some bis(iodonium hydrogen sulfate) salt crystallizes out upon cooling. It is filtered off and washed with a small volume of cold water and acetone to give 1.2 grams of hydrogen sulfate salt. The filtrate is treated with 35 milliliters of concentrated hydrochloric acid added dropwise with stirring and cooling over a 30 minute period. The crude bis(iodonium chloride) salt is filtered off and washed with acetone. The slightly off-white solid, when dry, weighs 17.1 grams, and melts at 188–193° C. with decomposition. The yield is substantially the same as that in the preceding example, taking into account the recovery of 1.2 grams of the corresponding hydrogen sulfate salt which crystallizes out prior to conversion to the chloride salt. The lactate salt is prepared by adding aqueous barium lactate to aqueous hydrogen sulfate salt until no more barium sulfate precipitates. The barium sulfate is filtered off and the lactate salt is recovered by concentrating to crystallization, cooling and filtering off the lactate crystals. The crystals are purified by recrystallization from aqueous ethanol.

In similar procedures, the following compounds of the present invention are prepared.

(I-4-chlorophenyl)-I'-phenyl-I,I'-(2,5-thiophenediyl)-bis(iodonium chloride) (melting at 201–203° C. with decomposition, molecular weight 595.51) by reacting 4-chlorophenyl-2-thienyliodonium trifluoroacetate with (diacetoxyiodo)benzene; the corresponding bromide and iodide salts (melting at 161–163° C., with decomposition and 87–89° C. with decomposition, respectively); and the tetrafluoroborate salt (molecular weight of 698.22).

2,5-thiophenediyl - bis(4 - chlorophenyliodonium chloride) (melting at 210–212° C. with decomposition, molecular weight 629.96) by reacting 4-chlorophenyl-2-thienyliodonium trifluoroacetate with 4-chloro-1-(diacetoxyiodo)benzene; the corresponding iodide salt (melting at 87–89° C. with decomposition).

(I - 3 - nitrophenyl)-I'-phenyl-I,I'-(2,5-thiophenediyl)-bis(iodonium chloride) (molecular weight 606.06) by reacting phenyl-2-thienyliodonium trifluoroacetate with 1-(diacetoxyiodo)-3-nitrobenzene.

(I - 3 - methoxyphenyl)-I'-phenyl-I,I'-(2,5-thiophenediyl)-bis(iodonium bromide) (molecular weight 680.01) by reacting phenyl-2-thienyliodonium trifluoroacetate and 1-(diacetoxyiodo)-3-methoxybenzene.

(I - 4 - acetamidophenyl)-I'-phenyl-I,I'-(2,5-thiophenediyl)-bis(iodonium nitrate) (molecular weight 671.23) by reacting phenyl-2-thienyliodonium trifluoroacetate and 4-acetamido-1-(diacetoxyiodo)benzene.

(I-2,6-xylyl) - I' - phenyl-I,I'-(2,5 - thiophenediyl)-bis-(iodonium chloride) (molecular weight 589.11) by reacting phenyl-2-thienyliodonium trifluoroacetate and 1-(diacetoxyiodo)-2,6-xylene.

(I - 2,4 - xylyl)-I'-phenyl-I,I'-(2,5 - thiophenediyl)-bis-(iodonium chloride) (molecular weight 589.11) by reacting phenyl-2-thienyliodonium trifluoroacetate and 1-(diacetoxyiodo)-2,4-xylene.

I-(2,5-xylyl) - I' - phenyl-I,I'-(2,5 - thiophenediyl)-bis-(iodonium chloride) (molecular weight 589.11) by reacting phenyl-2-thienyliodonium trifluoroacetate and 1-(diacetoxyiodo)-2,5-xylene.

(I - 3,4 - xylyl)-I'-phenyl-I,I'-(2,5 - thiophenediyl)-bis-(iodonium chloride) (molecular weight 589.11) by reacting phenyl-2-thienyliodonium trifluoroacetate and 1-(diacetoxyiodo)-3,4-xylene; the trifluoroacetate salt has a molecular weight of 744.24.

(I - 2,4 - dichlorophenyl)-I'-phenyl-I,I'-(2,5-thiophenediyl)-bis(iodonium hydrogen sulfate) (molecular weight 753.19) by reacting phenyl-2-thienyliodonium trifluoroacetate and 1-(diacetoxyiodo)-2,4-dichlorobenzene.

(I - 4 - methoxyphenyl)-I'-phenyl-I,I'-(2,5-thiophenediyl)-bis(iodonium bromide) (molecular weight 680.01) by reacting phenyl-2-thienyliodonium trifluoroacetate and 1-(diacetoxyiodo)-4-methoxybenzene.

I - 3,4 - dichlorophenyl)-I'-phenyl-I,I'-(2,5-thiophenediyl)-bis(iodonium chloride) (molecular weight 629.96) by reacting phenyl-2-thienyliodonium trifluoroacetate and 1-(diacetoxyiodo)-3,4-dichlorobenzene.

I - 3,4,5 - trichlorophenyl)-I'-phenyl-I,I'-(2,5-thiophenediyl)-bis(iodonium lactate) (molecular weight 772.63) by reacting phenyl-2-thienyliodonium trifluoroacetate and 1-(diacetoxyiodo)-3,4,5-trichlorobenzene.

(I - 2,4,6 - trichlorophenyl) - I' - phenyl-I,I'-(2,5 - thiophenediyl) - bis(iodonium lactate) (molecular weight 772.63) by reacting phenyl-2-thienyliodonium trifluoroacetate and 1-(diacetoxyiodo)-2,4,6-trichlorobenzene.

(I - 2,4,5 - trimethylphenyl) - I' - phenyl-I,I'-(2,5-thiophenediyl) - bis(iodonium lactate) (molecular weight 711.37) by reacting phenyl-2-thienyliodonium trifluoroacetate and 1-(diacetoxyiodo)-2,4,5-trimethylbenzene.

(I - 3,4 - dimethoxyphenyl) - I' - phenyl-I,I'-(2,5 - thiophenediyl)-bis(iodonium chloride) (molecular weight 621.11) by reacting phenyl-2-thienyliodonium trifluoroacetate and 1-(diacetoxyiodo)-3,4-dimethoxybenzene.

(I - 3 - nitrophenyl) - I' - 4 - nitrophenyl-I,I'-(2,5 - thiophenediyl)-bis(iodonium chloride) (molecular weight 651.06) by reacting 4-nitrophenyl-2-thienyliodonium trifluoroacetate and 1-(diacetoxyiodo)-3-nitrobenzene.

2,5-thiophenediyl - bis(3 - trifluoromethylphenyliodonium chloride) (molecular weight 697.06) by reacting 3-trifluoromethylphenyl-2-thienyliodonium trifluoroacetate and 1-(diacetoxyiodo)-3-trifluoromethylbenzene.

2,5 - thiophenediyl - bis(4 - acetamidophenyliodonium chloride) (molecular weight 675.16) by reacting 4-acetamido-1-(diacetoxyiodo)benzene.

2,5 - thiophenediyl - bis(4 - nitrophenyliodonium chloride) (molecular weight 651.06) by reacting 4-nitrophenyl-2-thienyliodonium trifluoroacetate and 1-(diacetoxyiodo)-4-nitrobenzene.

2,5 - thiophenediyl - bis(3 - nitrophenyliodonium chloride) (molecular weight 651.06) by reacting 3-nitrophenyl-2-thienyliodonium trifluoroacetate and 1-(diacetoxyiodo)-3-nitrobenzene.

(I - 3 - nitro - 4 - tolyl) - I'-3-nitrophenyl-I,I'-(2,5-thiophenediyl) - bis(iodonium chloride) (molecular weight 665.09) by reacting 3-nitrophenyl-2-thienyliodonium trifluoroacetate and 1-(diacetoxyiodo)-3-nitro-4-toluene.

(I - 3 - nitro- 4 - tolyl)-I'-4-fluorophenyl-I,I'-(2,5-thiophenediyl) - bis(iodonium bromide) (molecular weight 727.00) by reacting 4-fluorophenyl-2-thienyliodonium trifluoroacetate and 1-(diacetoxyiodo)-3-nitro-4-toluene.

(I-3,4 - dichlorophenyl)-I'-4-chlorophenyl-I,I'-(2,5-thiophenediyl) - bis(iodonium chloride) (molecular weight 664.40) by reacting 4-chlorophenyl-2-thienyliodonium trifluoroacetate and 1-(diacetoxyiodo)-3,4-dichlorobenzene.

(I - 3,4 - dichlorophenyl)-I'-4-tolyl-I,I'-(2,5-thiophenediyl)-bis(iodonium chloride) (molecular weight 643.99) by reacting 4-tolyl-2-thienyliodonium trifluoroacetate and 1-(diacetoxyiodo)-3,4-dichlorobenzene.

(I - 3,4 - dichlorophenyl)-I' - 4 - bromophenyl-I,I'-(2,5-thiophenediyl)-bis(iodonium nitrate)(molecular weight 761.97) by reacting 4-bromophenyl-2-thienyliodonium trifluoroacetate and 1 - (diacetoxyiodo) - 3,4 - dichlorobenzene.

(I - 3,4 - dichlorophenyl) - I' - 4 - ethoxyphenyl - I,I'-(2,5 - thiophenediyl) bis(iodonium chloride) (molecular weight 674.01) by reacting 4-ethoxyphenyl-2-thienyliodonium trifluoroacetate and 1-(diacetoxyiodo)-3,4-dichlorobenzene.

(I - 3,4 - dichlorophenyl) - I' - 4 - nitrophenyl - I,I'-(2,5 - thiophenediyl) - bis(iodonium chloride) (molecular weight 674.96) by reacting 4-nitrophenyl-2-thienyliodonium trifluoroacetate and 1-(diacetoxyiodo)-3,4-dichlorobenzene.

(I - 3,4 - dichlorophenyl) - I' - 3,4 - xylyl-I,I'-(2,5-thiophenediyl) - bis(iodonium nitrate) (molecular weight 711.11) by reacting 3,4-xylyl-2-thienyliodonium trifluoroacetate and 1-(diacetoxyiodo)-3,4-dichlorobenzene.

2,5-thiophenediyl-bis(3,4-dichlorophenyliodonium lactate) (molecular weight 807.08) by reacting 3,4-dichlorophenyl - 2 - thienyliodonium trifluoroacetate and 1-(diacetoxyiodo)-3,4-dichlorobenzene.

2,5 - thiophenediyl - bis(3,4 - xylyliodonium lactate) (molecular weight 725.39) by reacting 3,4-xylyl-2-thienyliodonium trifluoroacetate and 1-(diacetoxyiodo)-3,4-xylene.

(I - 3,4,5 - trichlorophenyl) - I' - 4 - chlorophenyl - I,I'-(2,5 - thiophenediyl) - bis(iodonium nitrate) (molecular weight 751.96) by reacting 4-chlorophenyl-2-thienyliodonium trifluoroacetate and 1-(diacetoxyiodo)-3,4,5-trichlorobenzene.

(I - 3,4,5 - trichlorophenyl) - I' - 4 - tolyl-I,I'-(2,5-thiophenediyl) - bis(iodonium chloride) (molecular weight 678.43) by reacting 4-tolyl-2-thienyliodonium trifluoroacetate and 1-(diacetoxyiodo)-3,4,5-trichlorobenzene.

(I - 3,4,5 - trichlorophenyl) - I' - 3,4 - dichlorophenyl-I,I'-(2,5-thiophenediyl)-bis(iodonium lactate) (molecular weight 841.52) by reacting 3,4-dichlorophenyl-2-thienyliodonium trifluoroacetate and 1-(diacetoxyiodo)-3,4,5-trichlorobenzene.

(I - 3,4,5 - trichlorophenyl) - I' - 2,4-xylyl-I,I'-(2,5-thiophenediyl) - bis(iodonium chloride) (molecular weight 629.45) by reacting 2,4-xylyl-2-thienyliodonium trifluoroacetate and 1-(diacetoxyiodo)-3,4,5-trichlorobenzene.

(I - 3,4,5 - trichlorophenyl) - I'-3,4-xylyl-I,I'-(2,5-thiophenediyl) - bis(iodonium nitrate) (molecular weight 745.56) by reacting 3,4-xylyl-2-thienyliodonium trifluoroacetate and 1-(diacetoxyiodo)-3,4,5-trichlorobenzene.

(I - 3,4,5 - trichlorophenyl) - I' - 3,4-dimethoxyphenyl-I,I'-(2,5-thiophenediyl)-bis(iodonium nitrate) (molecular weight 777.56) by reacting 3,4-dimethoxyphenyl-2-thienyliodonium trifluoroacetate and 1-(diacetoxyiodo)-3,4,5-trichlorobenzene.

(I - 2,4,6 - trichlorophenyl) - I' - 3,4,5-trichlorophenyl-I,I' - (2,5-thiophenediyl)-bis(iodonium chloride) (molecular weight 767.75) by reacting 3,4,5-trichlorophenyl-2-thienyliodonium trifluoroacetate and 1 - (diacetoxyiodo)-2,4,6-trichlorobenzene.

2,5 - thiophenediyl - bis(3,4,5-trichlorophenyliodonium chloride) (molecular weight 767.75) by reacting 3,4,5-trichlorophenyl - 2 - thienyliodonium trifluoroacetate and 1-(diacetoxyiodo)-3,4,5-trichlorobenzene.

2,5 - thiophenediyl - bis(3,4,5-trichlorophenyliodonium lactate) (molecular weight 875.98) by reacting 3,4,5-trichlorophenyl - 2 - thienyliodonium trifluoroacetate and 1-(diacetoxyiodo)-3,4,5-trichlorobenzene.

The compounds of the present invention are useful as microbicides. They have high toxicity toward many bacterial organisms or plants including gram-negative and gram-positive types such as Staphylococcus aureus, Salmonella typhosa, Bacillus subtilis, Escherichia coli, Pseudomonas aeruginosa, Candida pelliculosa, Aspergillus terreus, Aerobacter aerogenes, Penicillium chrysogenum, Aspergillus niger, Chaetomium globosum, Penicillium digitatum, Phomopsis citri, Diplodia natalensis, Alternaria solani, Erwinia amylovora, and Rhizoctonia solani. The compounds may be applied to many bacterial plants and their habitats in bactericidal amounts to obtain excellent controls of the microbial organisms which attack the seeds, roots or above-ground portions of terrestrial plants. For such uses, the unmodified compounds can be employed. The compounds can also be dispersed on an inert finely divided solid and employed as dusts. Such mixture can also be dispersed in water with or without the aid of a surface active agent and employed as sprays. In other procedures, the products can be employed as active constituents in solvent solutions, aqueous dispersions or oil-in-water and water-in-oil emulsions. Good results are obtained with methods employing and compositions containing microbicidal or antimicrobial amounts of the novel compounds. Preferred compositions contain from 0.0001 to 50 percent by weight of compound. The compounds may be included in adhesives, cooling waters, inks, plasticizers, latices, polymers, resins, fuels, greases, soaps, detergents, cutting oils and oil or latex paints to prevent mold and mildew and the degradation of such products resulting from microbial attack. Also, it has been discovered that the compounds advantageously may be distributed in textiles, fabrics, and paper or other cellulosic products, or may be employed in the impregnations of wood, lumber, wallboard and plaster to protect such products from the attack of the bacterial organisms of rot, mold, mildew and decay In representative operations, each of 2,5-thiophenediyl-bis(phenyliodinium chloride), I - 4 - chlorophenyl - I'-phenyl-I,I' - (2,5 - thiophenediyl) - bis(iodonium chloride) and (I-4-chlorophenyl)-I'-4-tolyl-I,I' - (2,5 - thiophenediyl) - bis(iodonium chloride) give complete kills and controls of Staphylococcus aureus, Salmonella typhosa, Aerobacter aerogenes and Pseudomonas aeruginosa when employed in nutrient broth at a concentration of 5 parts per million by weight.

In further operations, 2,5 - thiophenediyl - bis(phenyl chloride) and I-4-chlorophenyl-I'-phenyl-I,I'-(2,5 - thiophenediyl)-bis(iodonium chloride) give complete kills and controls of downey mildew on lettuce and apple scab fungus on apple trees when employed as aqueous foliage spray compositions containing 1,000 parts per million by weight of said compounds.

The phenyl-2-thienyliodonium trifluoroacetate starting materials are prepared by reacting together trifluoroacetic acid, thiophene and a diacetoxyiodo compound have the formula

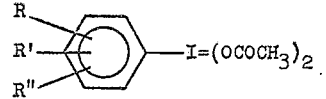

The reaction is preferably carried out in an organic liquid as reaction medium, such as methylene chloride, ethylene dichloride, carbon tetrachloride, methyl chloroform, and conveniently in acetic anhydride or in a mixture of acetic anhydride and trifluoroacetic acid. The reaction goes forward when the reagents are employed in any amount. The reaction consumes the reagents in substantially equimolecular amounts and the employment of amounts which represent about equimolecular proportions is preferred. The reaction proceeds under temperatures of from about —30 to about 40° C. and is preferably carried out at temperatures of about —20 to 40° C. Upon completion of the reaction, the desired thienyliodonium trifluoroacetate is separated by conventional procedures.

In a convenient method of carrying out the reaction, the trifluoroacetic acid and iodosodiacetate are brought together in the reaction medium and the thiophene reagent added portionwise thereto with agitation. The reaction is exothermic and goes forward readily with the addition of the thiophene. The temperature of the reaction mixture can be controlled by regulating the rate of the addition of thiophene and by external cooling. The reaction is essentially complete upon completion of the addition of the thiophene. Allowing the resulting mixture to stand for a period of time at somewhat elevated temperatures oftentimes gives some improvement in yield. Upon completion of the reaction, the reaction mixture may be distilled under reduced pressure to remove a portion of the volatile constituents and obtain the desired phenyl-2-thienyliodonium trifluoroacetate as an oily or crystalline residue. Oily residues may be treated with ether to crystallize reaction products. Crystalline reaction products may be further purified by crystallization from organic solvents such as acetone, ethylacetate, heptane, or mixtures thereof.

By way of example, 1-(diacetoxyiodo)-4-nitro-benzene (0.24 gram mole) is dispersed in 250 milliliters of acetic anhydride and 75 milliliters of trifluoroacetic acid, and thiophene (0.49 gram mole) dissolved in 300 milliiters of acetic anhydride is added thereto portionwise with stirring. The addition is carried out over a period of 2½ hours at −20° C. The temperature of the reaction mixture is thereafter allowed to rise to −5° C. and stirring is continued thereafter for 14 hours. The volatiles are thereafter removed by distillation under reduced pressure at gradually increasing temperatures up to a temperature of 60° C. at 1–2 millimeters Hg to obtain the 4-nitrophenyl-2-thienyliodonium trifluoroacetate as a crystalline residue. The residue is washed with ether and the washed product is successively recrystallized from a mixture of ethyl acetate and acetone. The recrystallized product is found to melt at 150–152° C.

In similar procedures, the following starting materials of the present invention are prepared.

4 - chlorophenyl-2-thienyliodonium trifluoroacetate by reacting 1-(diacetoxyiodo) - 4 - chlorobenzene with thiophene and trifluoroacetic acid.

4 - tolyl-2-thienyliodonium trifluoroacetate by reacting 1-(diacetoxyiodo)-4-toluene with thiophene and trifluoroacetic acid.

3,4 - dichlorophenyl - 2-thienyliodonium trifluoroacetate by reacting 1-(diacetoxyiodo)-3,4-dichlorobenzene with thiophene and trifluoroacetic acid.

4 - fluorophenyl - 2 - thienyliodonium trifluoroacetate by reacting 1-(diacetoxyiodo)-4-fluorobenzene with thiophene and trifluoroacetic acid.

4 - bromophenyl - 2 - thienyliodonium trifluoroacetate by reacting 1-(diacetoxyiodo)-4-bromobenzene with thiophene and trifluoroacetic acid.

2,5 - xylyl - 2 - thienyliodonium trifluoroacetate by reacting 1-(diacetoxyiodo)-2,5-xylene with thiophene and trifluoroacetic acid.

2,6 - xylyl - 2 - thienyliodonium trifluoroacetate by reacting 1 - (diacetoxyiodo)-2,6-xylene with thiophene and trifluoroacetic acid.

Phenyl - 2 - thienyliodonium trifluoroacetate by reacting (diacetoxyiodo)benzene with thiophene and trifluoroacetic acid.

4 - ethoxyphenyl - 2 - thienyliodonium trifluoroacetate by reacting 1 - (diacetoxyiodo)-4-ethoxybenzene with thiophene and trifluoroacetic acid.

2,4 - di(trifluoromethyl)phenyl - 2 - thienyliodonium trifluoroacetate by reacting 1 - (diacetoxyiodo)-2,4-di(trifluoromethyl)benzene with thiophene and trifluoroacetic acid.

3 - trifluoromethylphenyl - 2 - thienyliodonium trifluoroacetate by reacting 1 - (diacetoxyiodo)-3-trifluoromethylbenzene with thiophene and trifluoroacetic acid.

The diacetoxyiodo compounds employed as starting materials as described herein are prepared in accordance with known methods. In such methods, a dichloride corresponding to the formula

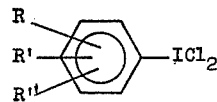

is reacted with lead acetate ($CH_3COO$—Pb—$OCOCH_3$). The reaction takes place readily at room temperature with the production of the desired diacetate and lead chloride.

The dichlorides employed in such mechanism are conveniently prepared in known procedures by the chlorination of an iodo compound

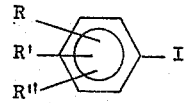

In an alternative procedure, all but the (diacetoxyiodo)-nitro compounds are prepared by reacting the iodo aromatic compound

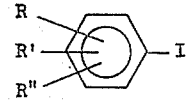

with peracetic acid in acetic acid and acetic anhydride solution. This reaction conveniently is carried out at room temperature. In these reactions, the desired products are isolated as crystalline solids and are separated and purified in accordance with known procedures.

What is claimed is:

1. The compound I,I'-(2,5-thiophenediyl)-bis(iodonium salt) represented by the formula

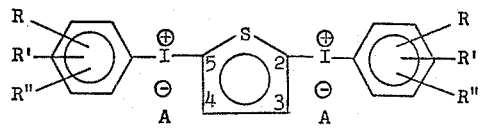

wherein each R represents hydrogen, fluoro, chloro, bromo, loweralkyl or loweralkoxy, each R' represents R or trifluoromethyl, each R" represents R, trifluoromethyl, nitro or acetamido and A represents an anion chosen from chloride, bromide, iodide, hydrogen sulfate, nitrate, tetrafluoroborate, trifluoroacetate and lactate.

2. The compound of claim 1 which is 2,5-thiophenediyl-bis(phenyliodonium chloride).

3. The compound of claim 1 which is (I-4-chlorophenyl) - I'-4-tolyl-I,I'-(2,5-thiophenediyl)-bis-(iodonium chloride).

4. The compound of claim 1 which is 2,5-thiophenediyl-bis(4-chlorophenyliodonium chloride).

5. The compound of claim 1 which is (I-4-chlorophenyl)-I'-phenyl-I,I'-(2,5-thiophenediyl) - bis(iodonium chloride).

6. The compound of claim 1 which is (I-4-chlorophenyl) - I'-phenyl-I,I'-(2,5-thiophenediyl)-bis(iodonium bromide).

7. The compound of claim 1 which is (I-4-chlorophenyl) - I'-phenyl-I,I'-(2,5-thiophenediyl)-bis(iodonium iodide).

8. The compound of claim 1 which is 2,5-thiophenediyl-bis(4-chlorophenyliodonium iodide).

References Cited

UNITED STATES PATENTS 3,422,152   1/1969   Doub _____ 260—612

OTHER REFERENCES

Beringer, et al., J.A.C.S. 81:342–51 (1959).
Neilands, C. A., 62:7661–2 (Mar. 29, 1965).

JOHN D. RANDOLPH, Primary Examiner
C. M. S. JAISLE, Assistant Examiner

U.S. Cl. X.R.

71—90; 260—332.2 R, 332.3 R, 541; 424—275